P. F. REICHHELM.
SOLDERING IRON.
APPLICATION FILED SEPT. 10, 1908.
1,111,762. Patented Sept. 29, 1914.
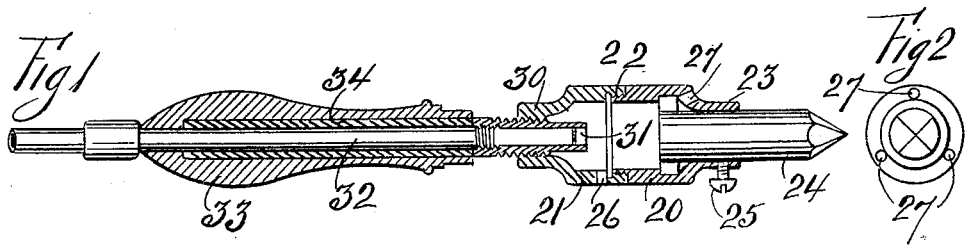
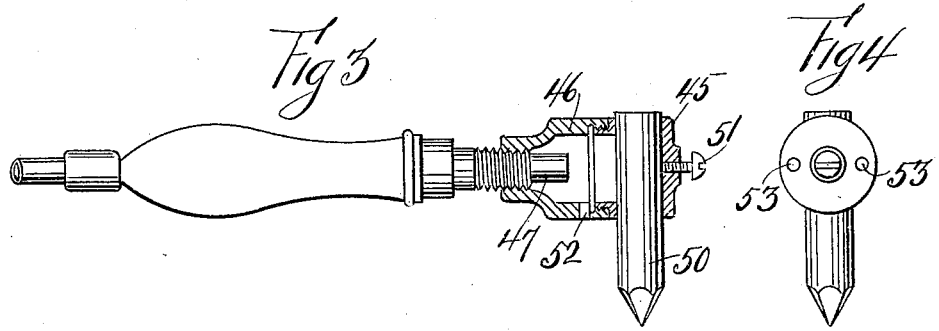
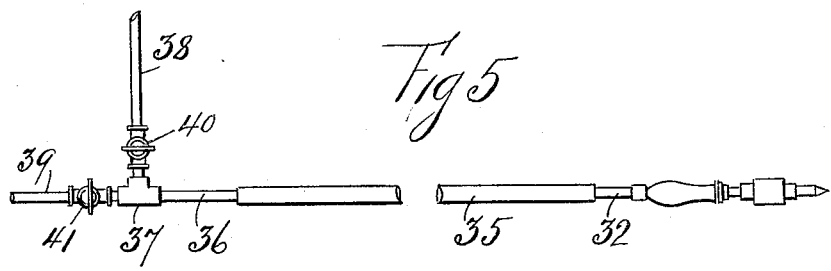
Witnesses
Geo. C. Eskholme.
John J. Millin
Inventor
Paul F. Reichhelm
By his Attorney
A. A. de Bonneville

UNITED STATES PATENT OFFICE.

PAUL F. REICHHELM, OF JERSEY CITY, NEW JERSEY.

SOLDERING-IRON.

1,111,762.          Specification of Letters Patent.      Patented Sept. 29, 1914.

Application filed September 10, 1908. Serial No. 452,362.

*To all whom it may concern:*

Be it known that I, PAUL F. REICHHELM, a citizen of the United States, and a resident of Jersey City, in the county of Hudson and State of New Jersey, have invented certain new and useful Improvements in Soldering-Irons, of which the following is a specification.

This invention relates to soldering irons, and its organization comprises an apparatus in which the soldering or smoothing tip is adjustably secured to a combustion chamber, that is supplied with a mixture of air and gas under pressure. The said chamber is connected with a handle having a cavity for a conduit to conduct the mixed air and gas, and around which conduit is located asbestos to prevent the overheating of the handle. The conduit is connected with a mixing chamber into which latter lead conduits for a gas and air supply respectively.

In the drawings Figure 1 shows a partial axial section of a soldering iron exemplifying the invention, Fig. 2 is a right hand end view of Fig. 1, Fig. 3 shows an outside view and partial axial section of a modification of the invention, Fig. 4 is a right hand end view of Fig. 3, and Fig. 5 represents an assembled view of the soldering iron with its appurtenances for supplying it with air and gas.

A combustion chamber is shown with the front portion 20 and rear portion 21, which portions are in threaded engagement as shown at 22. With the portion 20 is formed a neck 23 in which is secured in the axial line of the apparatus, the soldering tip 24, by means of the screw 25. A lighting aperture 26 is formed in the portion 21, and vent openings 27 are formed in the portion 20.

With the portion 21 is formed the neck 30 which is threaded for the burner 31, and to the latter is screwed the conduit 32 that carries the charge of mixed air and gas to the combustion chamber.

A handle 33 preferably of wood is counterbored for the asbestos packing 34.

The conduit 32 is connected with one end of a flexible tube 35, and the other end of said tube is connected with the conduit 36. A T 37 which constitutes a mixing chamber is connected with the conduit 36. A conduit 38 for the gas supply connects with the T 37 while a conduit 39 for the air supply also connects with the T 37. Cocks 40 and 41 are respectively connected up with the conduits 38 and 39 to regulate the supply of gas and air.

In Figs. 3 and 4 which show the modified form of the invention a combustion chamber is represented with the front portion 45 and the rear portion 46. The burner 47 with its immediate appurtenances are similar to those described for Figs. 1 and 2. In the portion 45 of the combustion chamber is secured a soldering tip 50 that is at right angles to the longitudinal axis of said chamber and is engaged by the screw 51. A lighting aperture 52 is formed in the portion 46 and two vent openings 53 are formed in the portion 45.

To use the invention and referring to the first form described, the soldering iron is connected up as shown in Fig. 5, the cocks 40 and 41 being opened the requisite amount to regulate the supply of gas and air to the mixing chamber or T 37, and from the latter the charge is conducted through the conduit 36, tube 35 and conduit 32 to the burner 31. From the latter the charge enters the combustion chamber, and is lighted at the opening 26 when it will heat the soldering tip 24 from the inside of said chamber.

The iron shown is used for soldering but the soldering tip could be easily replaced by a burnishing iron.

It will be noted that the soldering tip or copper extends to the inside of the combustion chamber, which allows the burning gases to completely envelop the end and a portion of the sides of said soldering tip.

Having described my invention, I claim:

The combination in a soldering iron of a combustion chamber compressing a front portion having a vent and a neck formed therewith, a rear portion for the chamber having a lighting aperture and detachably connected to the front portion, a soldering tip detachably connected to said neck extending from the outside of the neck into said front portion, a burner extending into the rear portion, a conduit detachably connected to said burner and a handle for said conduit.

Signed at the borough of Manhattan, in the county of New York and State of New York, this 2d day of September, A. D. 1908.

PAUL F. REICHHELM.

Witnesses:
EDWIN LEWIS,
M. R. McAVOY.